US010825450B2

(12) United States Patent
Kahlon et al.

(10) Patent No.: US 10,825,450 B2
(45) Date of Patent: Nov. 3, 2020

(54) METHODS AND SYSTEMS FOR PROVIDING A RESPONSE TO AN AUDIO QUERY WHERE THE RESPONSE IS DETERMINED TO HAVE A PUBLIC SAFETY IMPACT

(71) Applicant: MOTOROLA SOLUTIONS, INC., Chicago, IL (US)

(72) Inventors: Haim Kahlon, Shoam (IL); Alexander Aperstein, Rehovot (IL); David Lev, Shoham (IL); Tamar Mordel, Hertzeliya (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 113 days.

(21) Appl. No.: 16/170,843

(22) Filed: Oct. 25, 2018

(65) Prior Publication Data

US 2020/0135182 A1 Apr. 30, 2020

(51) Int. Cl.
*G10L 15/18* (2013.01)
*H04W 4/90* (2018.01)
*G10L 15/22* (2006.01)

(52) U.S. Cl.
CPC ......... *G10L 15/1822* (2013.01); *G10L 15/22* (2013.01); *H04W 4/90* (2018.02); *G10L 2015/225* (2013.01)

(58) Field of Classification Search
CPC ... G10L 15/18; G06Q 50/265; G06F 17/3043; G06F 17/30; G06F 17/3079; G06F 17/28
See application file for complete search history.

(56) References Cited

U.S. PATENT DOCUMENTS 8,712,759 B2 * 4/2014 Ylonen .................. G06F 40/30
704/9
8,903,713 B2 * 12/2014 Peterson ............... G06F 40/117
704/9

(Continued)

FOREIGN PATENT DOCUMENTS

WO 2006/042028 4/2006

OTHER PUBLICATIONS

Extended European Search Report dated Feb. 27, 2020 for related European Application No. 19204575.5 (11 pages).

*Primary Examiner* — Anne L Thomas-Homescu
(74) *Attorney, Agent, or Firm* — Michael Best & Friedrich LLP

(57) ABSTRACT

An electronic computing device for providing a response to an audio query where the response is determined to have a public safety impact. The electronic computing device includes a microphone and an electronic processor. The electronic processor is configured to receive audio data including a speech segment and determine a plurality of possible meanings of the speech segment. Each possible meaning is associated with a probability that the possible meaning is a correct meaning for the speech segment and a first possible meaning is associated with a first probability that is higher than a second probability associated with a second possible meaning. The electronic processor is also configured to determine public safety impact context information of the second possible meaning. The electronic processor is further configured to output a second response associated with the second possible meaning without first outputting a first response associated with the first possible meaning.

20 Claims, 4 Drawing Sheets

(56) References Cited

U.S. PATENT DOCUMENTS

| | | | | |
|---|---|---|---|---|
| 8,924,197 | B2* | 12/2014 | Pragada | G06F 16/24522 704/9 |
| 8,943,371 | B2* | 1/2015 | Russo | G06N 5/04 714/46 |
| 9,053,427 | B1* | 6/2015 | Myslinski | G06F 16/2365 |
| 9,092,521 | B2* | 7/2015 | Myslinski | G06Q 10/10 |
| 9,218,634 | B1* | 12/2015 | Sarpy, Sr. | H04W 4/90 |
| 9,454,960 | B2* | 9/2016 | Stewart | G10L 15/08 |
| 9,961,516 | B1* | 5/2018 | Proctor | H04W 4/10 |
| 10,049,420 | B1* | 8/2018 | Lee | G06F 40/30 |
| 10,606,955 | B2* | 3/2020 | Jayaraman | G06F 40/30 |
| 2009/0077047 | A1* | 3/2009 | Cooper | G06F 40/30 |
| 2009/0089044 | A1* | 4/2009 | Cooper | G06F 40/30 704/9 |
| 2009/0228501 | A1* | 9/2009 | Shockro | G06F 16/25 |
| 2014/0257794 | A1* | 9/2014 | Gandrabur | G10L 15/1822 704/9 |
| 2014/0306814 | A1* | 10/2014 | Ricci | G06K 9/00832 340/425.5 |
| 2014/0306834 | A1* | 10/2014 | Ricci | G06Q 10/20 340/902 |
| 2015/0019533 | A1* | 1/2015 | Moody | G06F 16/951 707/722 |
| 2015/0046491 | A1* | 2/2015 | Clark | G06F 16/2471 707/770 |
| 2015/0061895 | A1* | 3/2015 | Ricci | G06F 16/25 340/902 |
| 2015/0347600 | A1* | 12/2015 | Tabe | G06F 16/9535 707/710 |
| 2016/0036899 | A1* | 2/2016 | Moody | G06F 16/951 709/217 |
| 2016/0203817 | A1* | 7/2016 | Formhals | G10L 15/22 379/45 |
| 2018/0150456 | A1* | 5/2018 | Kozloski | G06F 40/30 |
| 2018/0181656 | A1* | 6/2018 | Proctor | G06N 5/022 |
| 2019/0082304 | A1* | 3/2019 | Bestor | H04L 65/1069 |
| 2019/0095069 | A1* | 3/2019 | Proctor | H04W 4/90 |
| 2019/0176820 | A1* | 6/2019 | Pindeus | G06K 9/00335 |
| 2019/0188328 | A1* | 6/2019 | Oyenan | G06F 3/167 |
| 2019/0271553 | A1* | 9/2019 | Simpson | G06Q 50/01 |
| 2019/0272589 | A1* | 9/2019 | Simpson | G06Q 30/0609 |
| 2019/0286733 | A1* | 9/2019 | Witkin | G06F 16/248 |
| 2019/0332948 | A1* | 10/2019 | Dhondse | G06F 16/24522 |
| 2020/0058305 | A1* | 2/2020 | Yang | G10L 15/265 |

\* cited by examiner

METHODS AND SYSTEMS FOR PROVIDING A RESPONSE TO AN AUDIO QUERY WHERE THE RESPONSE IS DETERMINED TO HAVE A PUBLIC SAFETY IMPACT

BACKGROUND OF THE INVENTION

Tablets, laptops, phones (for example, cellular or satellite), mobile (vehicular) or portable (personal) two-way radios, and other communication devices are now in common use by users, such as first responders (including firefighters, police officers, and paramedics, among others), and provide such users and others with access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1A:
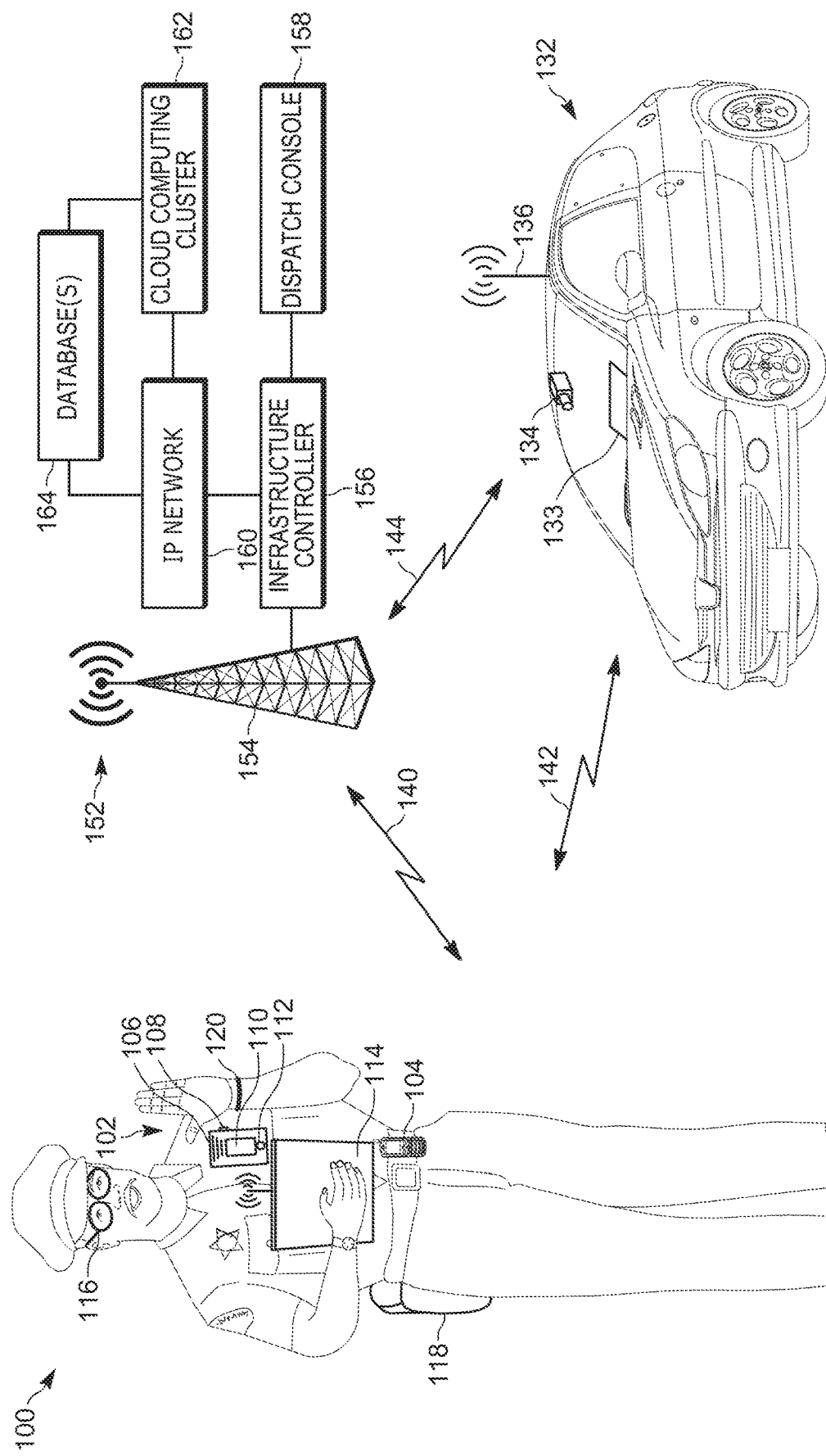
FIGS. 1A and 1B are system diagrams illustrating a system for providing a response to an audio query where the response is determined to have a public safety impact in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Background noise, poor annunciation, and the like may make it difficult for an electronic digital assistant to determine a meaning or intent of a speech segment (for example, a name, a number, or an address) associated with an audio query submitted by a user with absolute certainty. As a result, the electronic digital assistant may generate a plurality of possible meanings for the speech segment and assign a probability to each possible meaning of the plurality of possible meanings. For example, the electronic digital assistant determines the probability for each possible meaning based on speech recognition algorithms (in other words, voice analytics). As another example, the electronic digital assistant determines the probability for each possible meaning based on speech recognition algorithms and as a function of context information such as recognition of similar speech segments included in recent previous audio queries. For example, the electronic digital assistant may determine that a possible meaning of "darts" for a speech segment has a higher probability than a possible meaning of "tarts" when recent previous queries related to sports or games. On the other hand, the electronic digital assistant may determine that a possible meaning of "tarts" for a speech segment has a higher probability than a possible meaning of "darts" when recent previous queries related to baked goods. The probability represents the likelihood that the possible meaning is the correct meaning (or the speaker's intended meaning) of the speech segment. The electronic digital assistant may generate a response such as a clarifying question to determine whether the possible meaning associated with the highest probability (for example, as determined by speech recognition algorithms) is the correct meaning for the speech segment.

However, the possible meaning of the speech segment with the highest probability is often incorrect (in other words, not the meaning intended by the speaker/user) due to, for example, background noise, poor annunciation, and the like. Thus, the electronic digital assistant often generates and outputs additional clarifying questions to attempt to determine the correct meaning of the speech segment. This back-and-forth communication between the electronic digital assistant and the user may occur one or several times before the electronic digital assistant determines the correct meaning of the speech segment. Such iterations of this back-and-forth communication consume valuable time while the user is waiting to receive information in response to their query. This delay may be especially disadvantageous when the ultimate response to the query includes information that may have a negative safety impact on the health, wellness, safety, or ownership or guardianship rights of the user, other users, citizens, or public or private property (e.g., public safety information relating to an escaped fugitive, a bomb threat, an active shooter, and the like). Additionally, the electronic digital assistant wastes resources such as battery life and processing capabilities by outputting numerous clarifying questions to attempt to determine the correct meaning of the speech segment. Accordingly, there is a technological problem with respect to the interaction between a user (for example, an officer) that provides a query to an electronic digital assistant and a user interface of the electronic digital assistant that provides a response to the query.

Disclosed are a method, device, and system for an electronic digital assistant to provide a response to an audio query where the response is determined to have a public safety impact. In some embodiments, the electrical digital assistant generates and outputs a response to the query (for example, at least one of a clarification question and information that responds to the query) based on public safety impact context information that identifies a public safety impact of a first possible meaning of a first speech segment even though a second possible meaning of a second speech segment has a higher probability of being the correct speech segment based on speech recognition algorithms, context information not indicative of a public safety impact, or both. In some embodiments, public safety impact context information includes information that affects the health, wellness, safety, or ownership or guardianship rights of the user, other users, citizens, or public or private property (e.g., public safety information relating to an escaped fugitive, a bomb threat, an active shooter, and the like). In some embodiments, the public safety impact context information includes information stored in public safety databases including, but not limited to, a registered vehicle database, a criminal database, a missing persons database, and a computer aided dispatch (CAD) incident database. In some embodiments, the public safety impact context information is at least one selected from the group consisting of criminal record information, missing persons information, registered vehicle information, stolen vehicle information, and public safety incident information. For example, when a public safety officer provides a query to the electronic digital assistant, one or more possible meanings of the plurality of possible meanings may be associated with context information that is of relevance to the safety of the public safety officer who submitted the query, other public safety officers, members of the public, or a combination of the foregoing. Continuing this example, the electronic digital assistant provides responses (such as asking clarifying questions) regarding the possible meanings associated with the public safety impact context information relevant to the public safety impact even though the respective probability that each of these possible meanings is the correct meaning as determined based on speech recognition algorithms, is lower than that of other possible meanings. In other words, such a method, device, and system prioritizes possible meanings of speech segments based on public safety impact context information of the possible meanings in addition to or as an alternative to prioritizing possible meanings based on speech recognition algorithms.

The method, device, and system address the above-noted technological problems by improving the interaction between a user (for example, an officer) that provides a query to an electronic digital assistant and a user interface of the electronic digital assistant that provides a response to the query. In some situations, the method, device, and system provide more relevant clarifying questions to the user based on public safety impact context information to reduce the amount of back-and-forth communication between the user and the electrical digital assistant. This reduction of back-and-forth communication improves user interaction with the electronic digital assistant. Additionally, the reduction of back-and-forth communication also improves the functionality of the electronic digital assistant itself by allowing a device implementing the electronic digital assistant to use less battery and processing capabilities due to the reduction of communication. In some situations, the method, device, and system provide a more relevant response to the query based on public safety impact context information, which improves user interaction with the electronic digital assistant.

One embodiment provides a method of providing a response to an audio query where the response is determined to have a public safety impact. The method includes receiving, via a microphone of an electronic computing device, audio data including a speech segment as a portion of the audio query. The method also includes determining, with an electronic processor of the electronic computing device, a plurality of possible meanings of the speech segment. Each possible meaning is associated with a probability that the possible meaning is a correct meaning for the speech segment. A first possible meaning of the plurality of possible meanings is associated with a first probability that is higher than a second probability associated with a second possible meaning of the plurality of possible meanings. The method also includes determining, with the electronic processor, context information of the second possible meaning. The context information includes public safety impact context information. The method further includes outputting a second response to the query associated with the second possible meaning based on determining that the context information of the second possible meaning includes the public safety impact context information, without first outputting a first response to the query associated with the first possible meaning.

Another embodiment provides an electronic computing device for providing a response to an audio query where the response is determined to have a public safety impact. The electronic computing device includes a microphone and an electronic processor. The electronic processor is configured to receive, via the microphone, audio data including a speech segment as a portion of the audio query. The electronic processor is also configured to determine a plurality of possible meanings of the speech segment. Each possible meaning is associated with a probability that the possible meaning is a correct meaning for the speech segment and a first possible meaning of the plurality of possible meanings is associated with a first probability that is higher than a second probability associated with a second possible meaning of the plurality of possible meanings. The electronic processor is also configured to determine context information of the second possible meaning. The context information includes public safety impact context information. The electronic processor is further configured to output a second response to the query associated with the second possible meaning based on determining that the context information of the second possible meaning includes the public safety impact context information without first outputting a first response to the query associated with the first possible meaning.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Figure 1B:
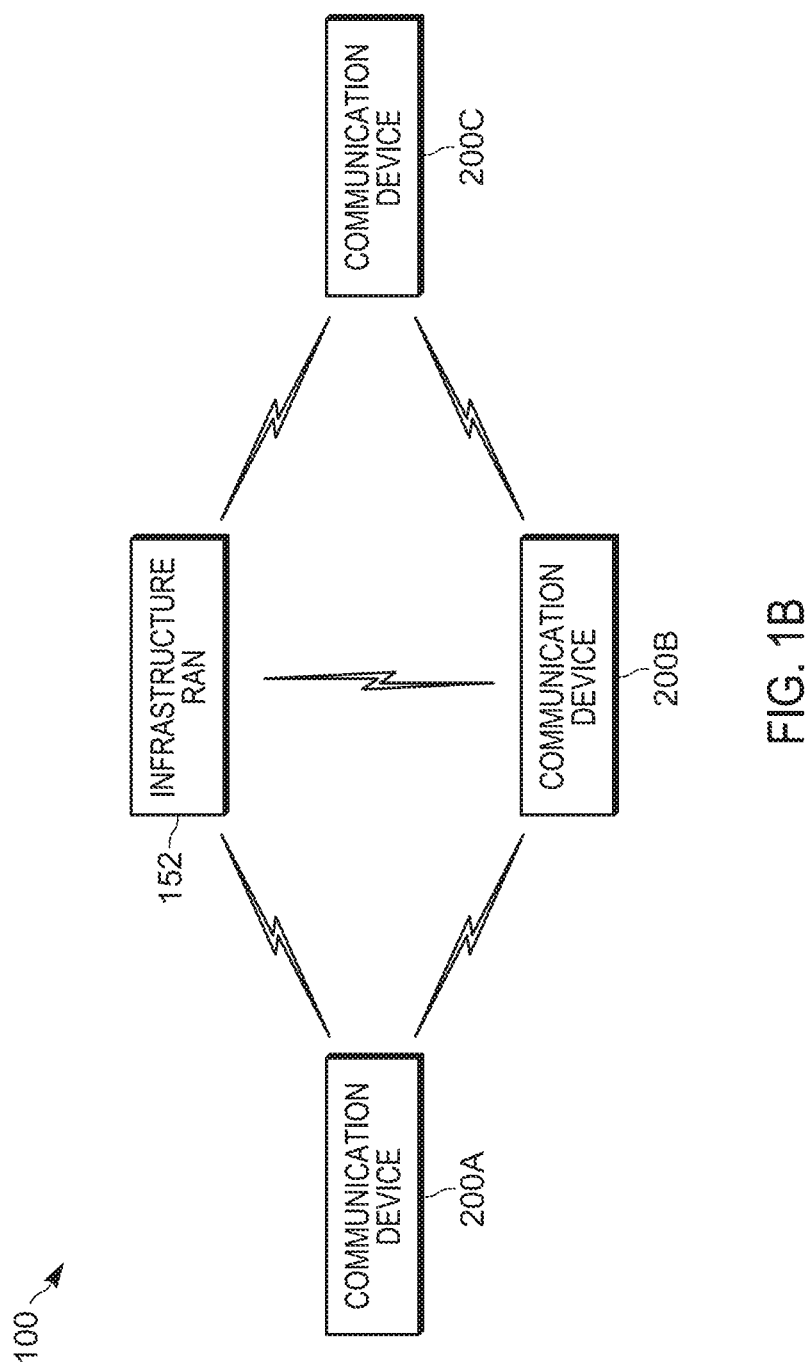

Referring now to the drawings, and in particular FIG. 1A, a communication system diagram illustrates a system 100 of devices including a first set of devices that a user 102 (illustrated in FIG. 1A as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (for example, which may be virtual reality, augmented reality, or mixed reality glasses), sensor-enabled holster 118, and/or biometric sensor wristband 120. Although FIG. 1A illustrates only a single user 102 with a respective first set of devices, in other embodiments, the single user 102 may include additional sets of same or similar devices, and additional users may be present with respective additional sets of same or similar devices as indicated by FIG. 1B.

System 100 may also include a vehicle 132 associated with the user 102 having an integrated mobile communication device 133, an associated vehicular video camera 134, and a coupled vehicular transceiver 136. Although FIG. 1A illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth, Zigbee, or NFC transmitter) with other communication devices and/or the infrastructure RAN 152.

In the example of FIG. 1A, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple. However, in some embodiments, these accessory devices additionally or alternatively include their own transceivers for infrastructure RAN or direct-mode media communication.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transceiver may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

While communication devices such as the portable radio 104 and the RSM video capture device 106 are explained in detail above, the other communication devices shown in FIG. 1A may be used for the same or similar purposes and may have the same or similar elements. For example, the functionality and elements described above with respect to the portable radio 104 and/or the RSM video capture device apply to one or more of the laptop 114, the smart glasses 116, the sensor-enabled holster 118, the biometric sensor wristband 120, and the mobile communication device 133. In some embodiments, the mobile communication device 133, the vehicular video camera 134 and/or microphone, and the vehicular transceiver 136 all may be coupled to one another via a wired and/or wireless vehicle area network (VAN), perhaps along with other sensors physically or communicatively coupled to the vehicle 132.

In some embodiments, the sensor-enabled holster 118 is an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In some embodiments, a weapon of the user 102 may include a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104. Although the biometric sensor wristband 120 is shown in FIG. 1A as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 detects characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID), or other short-range wireless protocol having a transmission range on the order of meters, tens of meters, or hundreds of meters.

The communication devices such as the portable radio 104, the RSM video capture device 106, and/or the mobile communication device 133 (or any other device in FIG. 1A for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). In some embodiments, devices within the vehicle 132 may communicate with devices in other vehicles via a Vehicular to Vehicular (V2V) network.

Although the RSM 106, the laptop 114, and the vehicle 132 are illustrated in FIG. 1A as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1A may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1A, among other possibilities. At least one other terminal, for example used in conjunction with the communication devices, may be a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

The infrastructure RAN 152 is illustrated in FIG. 1A as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1A, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1A, one or more proxy servers or load balancing servers may control which one or more computing devices perform any part or all of the electronic digital assistant service.

As shown in FIG. 1A, database(s) 164 may be accessible via the IP network 160 and/or the cloud computing cluster 162, and may include databases such as a long-term video storage database, a historical or forecasted weather database, an offender or criminal record database perhaps including facial recognition images to match against, a cartographic database of streets and elevations, a traffic database of historical or current traffic conditions, a vehicle database, a missing persons database, and a computer aided dispatch (CAD) incident database, or other types of databases. Databases 164 may further include all or a portion of the databases described herein as being provided at the infrastructure controller 156. In some embodiments, the databases 164 may be maintained by third parties (for example, the National Weather Service or a Department of Transportation, respectively). As shown in FIG. 1A, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1A are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1A describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (for example, a shuttle or self-balancing scooter). In other embodiments, the communication system 100 may additionally or alternatively be a warehouse communication system, a private security communication system, a medical communication system, a heavy machinery communication system (for example, used when excavating, bulldozing, mining, and the like), and the like.

As mentioned previously, many of the devices shown in FIG. 1A (such as the portable radio 104, the RSM video capture device 106, the laptop 114, the mobile communication device 133, the infrastructure controller 156, the dispatch console 158, and one or more computing devices in the cloud computing cluster 162) may be referred to as communication devices (for example, a communication device 200 as explained below with respect to FIG. 2). Although FIG. 1A shows multiple communication devices 200 associated with the user 102, in some embodiments, the communication system 100 includes communication devices 200 of multiple users. For example, as shown in FIG. 1B, the communication device 200A is associated with a first user, the communication device 200B is associated with a second user, and the communication device 200C is associated with a third user. As indicated by FIG. 1B, in some embodiments, the communication devices 200A, 200B, and 200C communicate with each other over the infrastructure RAN 152 and/or communicate with each other directly as described previously herein. Similarly, other devices, such as the dispatch console 158, may communicate with communication devices 200 of multiple users through the infrastructure RAN 152. In some embodiments, one or more users may have multiple associated communication devices 200, for example, as shown in FIG. 1A.

b. Device Structure

Figure 2:
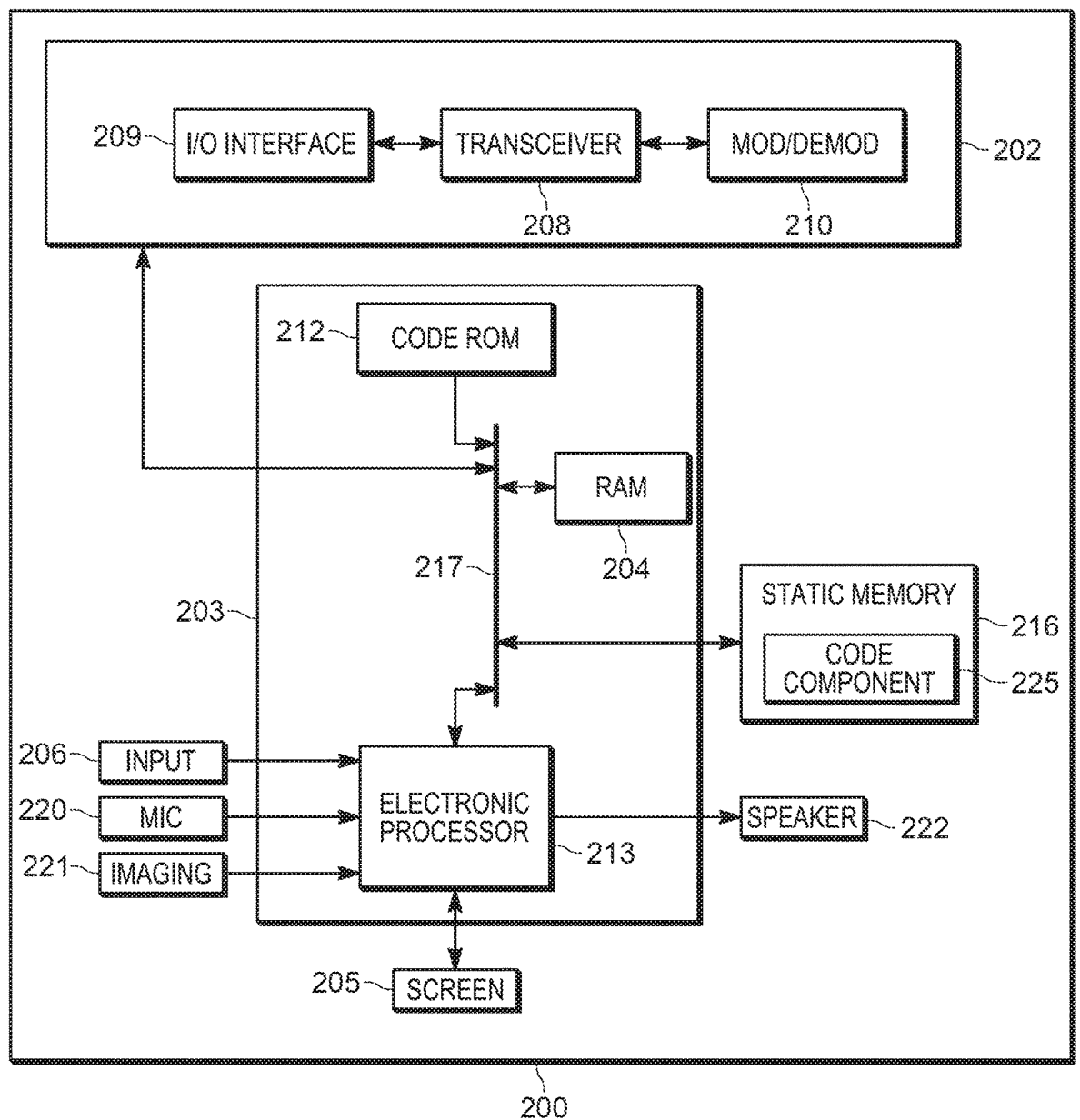
FIG. 2 is a device diagram showing a device structure of a communication device of the system of FIGS. 1A and 1B in accordance with some embodiments.

FIG. 2 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1A, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200. As another example, the mobile communication device 133 may be communicatively coupled to an occupant sensor of the vehicle 132, and the combination may be considered a single communication device 200.

While FIG. 2 represents the communication devices described above with respect to FIGS. 1A and 1B, depending on the type of the communication device, the communication device 200 may include fewer or additional components in configurations different from that illustrated in FIG. 2. For example, in some embodiments, the communication device 200 acting as the infrastructure controller 156 may not include one or more of the screen 205, microphone 220, imaging device 221, and speaker 222. As another example, in some embodiments, the communication device 200 acting as the portable radio 104 or the RSM video capture device 106 may further include a location determination device (for example, a global positioning system (GPS) receiver) as explained above. Other combinations are possible as well.

As shown in FIG. 2, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 3 and the accompanying text. The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

2. Processes for Providing a Response to an Audio Query where the Response is Determined to have a Public Safety Impact In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end device in the cloud computing cluster 162 accessible via an IP network 160.

To use the electronic digital assistant implemented by the electronic computing device, the user 102 may, for example, provide an oral query (in other words, an audio query) that is received by the microphone 220 of the communication device 200. The electronic computing device receives signals representative of the oral query from the microphone 220 and analyzes the signals to determine the content of the oral query. For example, the electronic computing device may include a natural language processing (NLP) engine configured to determine the intent and/or content of the oral query. The electronic computing device may also be configured to determine a response to the oral query (for example, by retrieving stored data or by requesting data from a database such as a database of the databases 164) and provide the response to an output device of the communication device 200 (for example, one or more of the speaker 222 via a generated audio response and the screen 205 via a generated text-based response). In other words, one or more of the communication device 200, embodied in one or more of the communication devices of FIG. 1A, such as the portable radio 104, the infrastructure controller 156, and the cloud computing cluster 162, may include a natural language processing engine to analyze oral queries received by the microphone 220 of the communication device 200 and provide responses to the oral queries.

Although an oral query is described above, in some embodiments, the electronic computing device receives and responds to other types of queries and inputs. For example, the user 102 may submit a text query to the electronic computing device by typing the text query into a hard keyboard input device or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video. In some embodiments, the electronic computing device may receive information from a communication device 200 of another user or from another electronic computing device (for example, a call or a message from another user).

In some embodiments, the user query and/or the received information may relate to public safety information. For example, the user query and/or the received information may relate to a past or current public safety incident in which public safety officers (for example, firefighters, police officers, paramedics, and the like) engage in to protect the public and keep the public safe (for example, a building fire, a criminal pursuit or other law enforcement event, a natural disaster, a medical incident, a traffic accident, and the like). For example, the received information may include a request for a back-up or a location to which a public safety officer should report. As another example, the user query and/or the received information may include other public safety-related information such as information relating to a criminal or suspect vehicle or information relating to a recommended public safety procedure.

Figure 3:
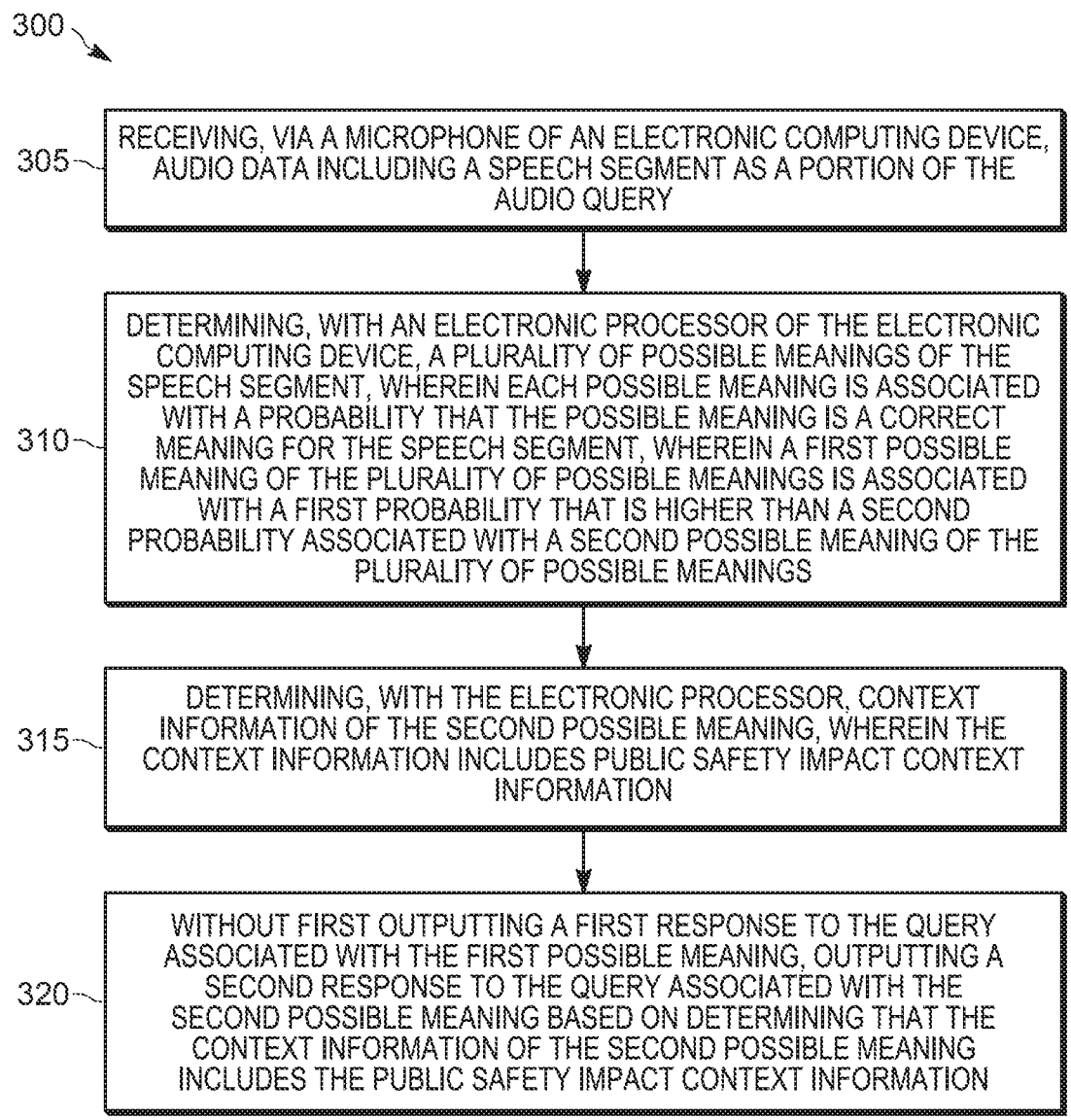
FIG. 3 illustrates a flow chart of a method of providing a response to an audio query where the response is determined to have a public safety impact in accordance with some embodiments.

To address the above-noted technological problems, the electronic computing device that implements the electronic digital assistant performs, in one instance, a method 300 illustrated in FIG. 3. In executing the method 300, the electronic computing device generates a response (for example, at least one of a clarification question and information that responds to the query) based on a public safety impact of a possible meaning of a speech segment included in a query. In some embodiments, the electrical digital assistant generates and outputs a response associated with a first possible meaning of the speech segment based on a public safety impact of the first possible meaning even though a second possible meaning of the speech segment has a higher probability of being the correct possible meaning based on speech recognition algorithms, other context information not indicative of a public safety impact, or both.

The method 300 addresses the above-noted technological problems by improving the interaction between a user (for example the user 102) that provides a query to an electronic digital assistant and a user interface of the electronic digital assistant that provides a response to the query. In some situations, the method 300 provides one or more responses associated with less probable meanings based on determined existing or potential public safety impacts of the less probable meaning(s) to reduce the amount of back-and-forth communication between the user 102 and the electrical digital assistant. This reduction of back-and-forth communication improves user interaction with the electronic digital assistant. Additionally, the reduction of back-and-forth communication also improves the functionality of the electronic digital assistant itself by allowing the electronic computing device that implements the electronic digital assistant to use less battery and processing capabilities due to the reduction of communication.

FIG. 3 illustrates a flow chart diagram of the method 300 performed by the electronic computing device for providing a response to an audio query where the response is determined to have a public safety impact. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure.

At block 305, the electronic computing device receives audio data including a speech segment associated with an audio query. For example, the electronic computing device may receive the audio data from the user 102, via the microphone 220 of the communication device 200. Each audio query may be separated into a plurality of audio segments, some or all of which may have multiple possible meanings. In one example, the audio query is "Who is the vehicle with the license plate number 123-XYZ registered to?" and a particular speech segment of interest having multiple possible meanings may be "123-XYZ." In another example, the electronic computing device may receive the audio query "Look up a license plate number" followed by a particular speech segment of interest having multiple possible meanings of "123-XYZ." While forthcoming examples will focus on the example of the particular speech segment of interest identified herein as "123-XYZ," in other embodiments, other speech segments of the audio query may be processed in a same or similar manner.

At block 310, the electronic computing device determines a plurality of possible meanings of the speech segment (e.g., the particular speech segment of interest identified above), wherein each possible meaning is associated with a probability that the possible meaning is a correct meaning for the speech segment and a first possible meaning of the plurality of possible meanings is associated with a first probability that is higher than a second probability associated with a second possible meaning of the plurality of possible meanings. In some embodiments, the plurality of possible meanings of the speech segment are determined based on speech recognition algorithms (in other words, voice analytics) and without using public safety impact context information associated with any of the plurality of possible meanings. In some embodiments, the electronic computing device uses context information that is not associated with a public safety impact to aid in determining the plurality of possible meanings of the speech segment (for example, recognition of similar speech segments included in recent previous audio queries as explained above). In some embodiments, the correct meaning is the meaning of the speech segment that the user 102 intended to send to the electronic computing device.

Continuing the above example, when the speech segment is "123-XYZ," the plurality of possible meanings determined via natural language processing of the speech segment or via keyword matching, or other voice processing systems or methods, and perhaps due to annunciation, noise, or other issues noted above, may be "123-XYC," "123-XYZ," and "123-AYZ." It should be noted that the electronic computing device may be configured to generate any number of possible meanings, less than a predetermined number of possible meanings, a specific number of possible meanings for the speech segment, or the like. A probability assigned to a possible meaning is based on how similar the audio data is to the possible meaning as determined based on speech recognition algorithms (in other words, voice analytics). In some embodiments, the electronic computing device also uses context information that is not associated with a public safety impact (in other words, context information that is not public safety impact context information) to aid in assigning a probability to each of the plurality of possible meanings of the speech segment. Continuing with the above example, "123-XYZ" may be assigned a probability of 60%, "123-XYC" may be assigned a probability of 50%, and "123-AYZ" may be assigned a probability of 30%.

At block 315, the electronic computing device determines context information of the second possible meaning, wherein the context information includes public safety impact context information. In some embodiments, public safety impact context information is information that indicates that the possible meaning is particularly relevant to, or has a negative impact on, the user 102, other individuals located near the user 102 or elsewhere, citizens, public or private property, and/or the health, wellness, safety, or ownership interests or guardianship rights of one or more of the foregoing. (for example, public safety information relating to an escaped fugitive, a bomb threat, an active shooter, and the like). In some embodiments, the public safety impact context information includes information stored in public safety databases including, but not limited to, a registered vehicle database, a criminal database, a missing persons database, and a computer aided dispatch (CAD) incident database. In some embodiments, the public safety impact context information is at least one consisting from the group consisting of criminal record information, missing persons information, registered vehicle information, stolen vehicle information, and public safety incident information. For example, when the electronic computing device receives a query including a speech segment that is a license plate number, the public safety impact may be that one of the possible meanings of the plurality of possible meanings is a license plate number of a vehicle that has recently been reported stolen. As another example, when the electronic computing device receives a query including a speech segment that is a name, the public safety impact may be that one of the possible meanings of the plurality of possible meanings is a name of a person who has a criminal record that includes violent crimes. The public safety impact context information may be obtained from a local or remote public safety database (for example, a database of the databases 164).

In some embodiments, the public safety impact context information may be retrieved from one or more public safety database(s). In some embodiments, the electronic computing device is configured to determine which public safety databases to request public safety impact context information from based on at least one selected from the group comprising the query with which the speech segment is associated, environmental information received from a plurality of sensors (for example, the microphone 220 and the imaging device 221) included in the electronic computing device, a role (for example, a crime scene analyst, a pathologist, or a field officer) associated with the user 102, and a task/mission (for example, responding to a robbery or responding to a domestic disturbance) assigned to the user 102. In one example, when the imaging device 221 receives an image including a vehicle and the query received by the electronic computing device includes the term "license plate," the electronic computing device may request public safety impact context information from a vehicle database. In another example, when the query received by the electronic computing device includes the term "background check," the electronic computing device may request public safety impact context information from a criminal record/history database. In yet another example, when the query received by the electronic computing device includes the term "missing person," the electronic computing device may request public safety impact context information from a database that indicates past missing person alerts and known relationships with dangerous people. As an example of requesting public safety impact context information based on a task/mission of the user 102, when the electronic computing device determines that the user 102 is a public safety officer handling a domestic dispute, the electronic computing device may request public safety impact context information from a database that includes the names of criminals previously involved in domestic disputes. As an example of requesting public safety impact context information based on a role of the user 102, the electronic computing device may request public safety impact context information from a forensics database when the user 102 is a crime scene analyst. However, when the user 102 is a patrolling officer in the field, the electronic computing device may request public safety impact context information from a criminal record database.

When the electronic computing device determines that there is public safety impact context information associated with the second possible meaning that identifies a public safety impact, the electronic computing device executes block 320. At block 320, the electronic computing device, without first outputting a first response to the query associated with the first possible meaning, outputs a second response associated with the second possible meaning. In one example situation, the electronic computing device may output the second response without outputting the first response at all (for example, when the second response corresponds to the correct meaning of the speech segment). In another example, the electronic computing device may output the second response before outputting the first response (for example, when the second response corresponds to an incorrect meaning of the speech segment). In both of the above examples, the electronic computing device outputs the second response without first outputting the first response. In some embodiments, the first response includes at least one of the group consisting of a first clarification question associated with the first possible meaning and first information associated with the first possible meaning that responds to the query. Similarly, in some embodiments, the second response includes at least one of the group consisting of a second clarification question associated with the second possible meaning and second information associated with the second possible meaning that responds to the query.

In some embodiments, the electronic computing device outputs the second response associated with the second possible meaning despite the first possible meaning having a higher probability of corresponding to the correct meaning as determined based on speech recognition algorithms, other context information not indicative of a public safety impact, or both. For example, when the possible meaning "123-XYC" is associated with public safety impact context information identifying a public safety impact (for example, the vehicle with the license plate 123-XYC has been reported stolen), the possible meaning "123-XYC" is included in the second response, even though the possible meaning "123-XYC" has a probability of 50% and the possible meaning "123-XYZ" has a higher probability of 60%. For example, the second response may be a clarification question that states, "Did you mean license plate number 123-XYC?" As another example, the second response may include information that is associated with the second possible meaning and responds to the query. For example, a response that includes information that is associated with the second possible meaning may be, "If you meant license plate number 123-XYC, please be aware that the owner has an outstanding warrant for unlawful use of a concealed weapon." As explained above, in some situations, the second response is output without the electronic computing device first outputting the first response associated with the first possible meaning.

In some embodiments, the electronic computing device may select the possible meaning to include in the second response by setting, for each possible meaning of the plurality of possible meanings, a variable associated with the possible meaning of the plurality of possible meanings. In some embodiments, the electronic computing device sets the variable based on whether there is public safety impact context information associated with the possible meaning that identifies a public safety impact. For example, when a possible meaning is associated with public safety impact context information identifying a public safety impact, a Boolean variable associated with the possible meaning may be set to true. When the electronic computing device determines which possible meaning to include in the second response, the electronic computing device chooses a possible meaning with the Boolean variable set to true prior to choosing a possible meaning with the Boolean variable set to false. In other embodiments, the electronic computing device may select the possible meaning to include in the second response by, for example, modifying the probability associated with each possible meaning associated with public safety impact context information. For example, in response to determining that the second possible meaning is associated with public safety impact context information, the electronic computing device may increase the second probability associated with the second possible meaning by 100% such that the second probability associated with the second possible meaning is greater than the first probability associated with the first possible meaning. Continuing this example, when the electronic computing device determines which possible meaning to include in the second response, the electronic computing device chooses a possible meaning associated with the highest modified probability.

In some situations, the electronic computing device determines that the first possible meaning is not associated with public safety impact context information. Accordingly, the second response associated with the second possible meaning is output prior to the first response associated with the first possible meaning as explained above. In some embodiments, when the plurality of possible meanings includes one or more possible meanings associated with multiple pieces of public safety context information (for example, the possible meaning is "John Smith" and he has previously been convicted of unlawful possession of a weapon and has been named as a suspect in a missing persons case), the possible meaning associated with the most pieces of public safety impact context information is output in the second response as explained below with respect to severity level determinations of public safety impact context information for each possible meaning.

In some embodiments, the electronic computing device ranks each of the possible meanings based on a severity level of the public safety impact context information associated with each of the possible meanings. For example, when multiple possible meanings are associated with one or more pieces of public safety impact context information, the electronic computing device determines a severity level associated with the public safety impact context information for each possible meaning. For example, the electronic computing device determines that the public safety impact context information associated with the first possible meaning is less severe than the public safety impact context information associated with the second possible meaning. For example, the public safety impact context information may indicate that a first vehicle having a license plate corresponding to the first possible meaning is stolen (a first severity level) while a second vehicle having a license plate corresponding to the second possible meaning was stolen during an armed robbery (a second severity level). In such a situation, the electronic computing device outputs a second response associated with the second possible meaning as a first course of action. When the user 102 indicates that the second possible meaning is incorrect, the electronic computing device outputs a first response regarding the first possible meaning. When the user 102 indicates that the first possible meaning is also incorrect, the electronic computing device may continue to output responses regarding additional possible meanings included in the plurality of possible meanings (for example, based on probability as determined by speech recognition algorithms). As emphasized by this example, in some embodiments, the electronic computing device ranks each of the possible meanings based on a severity level of the public safety impact context information associated with each possible meaning. The electronic computing device then outputs responses in an order according to the severity level rankings until the correct meaning is determined as described below.

In some embodiments, the electronic computing device determines the severity level rankings for each of the plurality of possible meanings based on an amount of pieces of public safety impact context information associated with each possible meaning. In other words, the electronic computing device may determine that the second possible meaning has a higher severity level than the first possible meaning based on more public safety impact context information being associated with the second possible meaning than the first possible meaning. Continuing one of the above examples, the possible meaning "John Smith" who has previously been convicted of unlawful possession of a weapon and has been named as a suspect in a missing persons case (a second security level) may be determined to have a higher severity level than "Tom Smith" who has been convicted of unlawful possession of a weapon without any other associated public safety impact confirmation information (a first security level).

As an example of one method of implementing a severity level scoring system for possible meanings of the speech segment, all possible meanings may start at a default/baseline severity level (for example, fifty points). When a possible meaning is not associated with public safety impact context information, the possible meaning remains at the default/baseline level. For each piece of public safety impact context information associated with a possible meaning, the electronic computing device may increase the severity level of the possible meaning by ten points. In some embodiments, the electronic computing device increases the severity level by different amounts depending on a type of public safety impact context information. For example, when a possible meaning is a person who has a criminal record that includes a felony, the electronic computing device may increase the severity level of the possible meaning by twenty points. However, when a possible meaning is a person who has a criminal record that includes a misdemeanor, the electronic computing device may increase the severity level of the possible meaning by ten points. The above scoring system and amounts are examples. In some embodiments, the scoring system and amounts are user-configurable via an input device such as the screen 205.

In some embodiments, when multiple possible meanings are associated with public safety impact context information of the same severity level, the electronic computing device may include in the second response the possible meaning having the highest probability (as determined by speech recognition algorithms) among the multiple possible meanings associated with public safety impact context information of the same severity level.

The second response, such as a second clarification question, may be output to the user 102 via, for example the speaker 222 or the display screen 205. In response to the second clarification question, the electronic computing device receives a response from the user 102 via, for example, the microphone 220 or a touch screen display screen 205. In some embodiments, the response indicates whether the possible meaning included in the second clarification question is the correct meaning. For example, when the electronic computing device receives the response "no" (in other words, a negative response indicating that the second possible meaning is not the correct meaning) to the second clarification question "Did you mean license plate number 123-XYC?", the electronic computing device determines that "123-XYC" is not the correct meaning for the speech segment. When the electronic computing device receives the response "yes" (in other words, an affirmative response indicating that the second possible meaning is the correct meaning) to the second clarification question "Did you mean license plate number 123-XYC?," the electronic computing device determines that "123-XYC" is the correct meaning for the speech segment.

In some embodiments, when the possible meaning included in the second clarification question is not the correct meaning, the electronic computing device outputs an additional clarification question. The additional clarification question may request the user 102 confirm that the user 102 did not intend a particular possible meaning that has not yet been output in a clarification question. The possible meaning output in the additional question may be determined using the method 300 used to determine the second clarification question, as described above. In some embodiments, the electronic computing device is configured to output additional clarification questions until the correct meaning for the speech segment is determined or until each possible meaning of the plurality of possible meanings has been output in a clarification question. In some embodiments, the electronic computing device is configured to prompt the user 102 to repeat the query, speech segment, or both after the electronic computing device outputs a predetermined number of clarifying questions and the electronic computing device has not determined the correct meaning of the speech segment.

In some embodiments, once the electronic computing device determines the correct meaning for the speech segment, the electronic computing device may output a response (a third response) to the query that includes information associated with the correct meaning that responds to the query. In some embodiments, when the correct meaning is associated with a public safety impact, the response may include information describing the public safety impact of the correct meaning as described above (for example, information that indicates that a vehicle is stolen or that a person has a criminal record including armed robberies). In some embodiments, the electronic computing device may also output a notification to a communication device associated with a dispatcher, a communication device associated with another user (for example, a nearby user), or both when the correct meaning of the speech segment is determined. The notification may include the information describing a public safety impact of the correct meaning of the speech segment. For example, when the correct meaning for the speech segment is a license plate number of a vehicle reported stolen, the electronic computing device may send a notification to a communication device associated with a first public safety officer who, for example, is or was previously investigating the theft of the vehicle. The notification may state that a second public safety officer (in other words, the user 102) has information about the stolen vehicle and may require assistance.

Although the examples given above are related to a query for vehicle registration information given a license plate number, other examples may be contemplated based on different queries. In one example, the electronic computing device may receive a query for information about a person named John Smith. In this example, one possible meaning of the possible meanings generated for the speech segment John Smith is determined to be a name of a person with a criminal record and is therefore determined to have a public safety impact. In another example, the electronic computing device may receive a query for information about property at a given address. In this example, one possible meaning of the possible meanings generated for the speech segment containing the address is determined to be an address that has been known for previous drug activity and is therefore determined to have a public safety impact.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device for providing a response to an audio query where the response is determined to have a public safety impact, the electronic computing device comprising:
   a microphone; and
   an electronic processor configured to
      receive, via the microphone, audio data including a speech segment as a portion of the audio query;
      determine a plurality of possible meanings of the speech segment, wherein each possible meaning is associated with a probability that the possible meaning is a correct meaning for the speech segment, wherein a first possible meaning of the plurality of possible meanings is associated with a first probability that is higher than a second probability associated with a second possible meaning of the plurality of possible meanings;
      determine that the first possible meaning is not associated with public safety impact context information;
      determine context information of the second possible meaning, wherein the context information of the second possible meaning includes first public safety impact context information; and without first outputting a first response to the audio query associated with the first possible meaning, output a second response to the audio query associated with the second possible meaning in response to determining that the first possible meaning is not associated with public safety impact context information and that the context information of the second possible meaning includes the first public safety impact context information.

2. The electronic computing device of claim 1, wherein the electronic processor is further configured to modify the second probability associated with the second possible meaning based on the first public safety impact context information.

3. The electronic computing device of claim 2, wherein the electronic processor is configured to modify the second probability associated with the second possible meaning based on the first public safety impact context information by increasing the second probability associated with the second possible meaning such that the second probability of the second possible meaning is greater than the first probability of the first possible meaning.

4. The electronic computing device of claim 1, wherein the electronic processor is configured to determine the first public safety impact context information by retrieving the first public safety impact context information from a local or remote public safety database.

5. The electronic computing device of claim 4, wherein the local or remote public safety database is one selected from the group consisting of a vehicle database, a criminal database, a missing persons database, and a computer aided dispatch (CAD) incident database.

6. The electronic computing device of claim 1, wherein the second response includes at least one of the group consisting of a clarification question associated with the second possible meaning and information associated with the second possible meaning that responds to the audio query.

7. The electronic computing device of claim 6, wherein, in response to the clarification question being output, the electronic processor is further configured to
receive a response to the clarification question indicating that the second possible meaning is not the correct meaning;
output additional clarification questions until the correct meaning for the speech segment is determined; and
in response to the correct meaning for the speech segment being determined, output a third response to the audio query related to the correct meaning.

8. The electronic computing device of claim 6, wherein the electronic processor is further configured to
in response to the clarification question being output, receive a response to the clarification question indicating that the second possible meaning is the correct meaning; and
in response to the response to the clarification question indicating that the second possible meaning is the correct meaning, output information describing the first public safety impact context information.

9. The electronic computing device of claim 8, wherein the electronic processor is further configured to
in response to the response to the clarification question indicating that the second possible meaning is the correct meaning, transmit a notification including information associated with the first public safety impact context information to at least one of the group consisting of a communication device associated with a dispatcher and a communication device associated with another user.

10. The electronic computing device of claim 1, wherein the electronic processor is configured to determine the plurality of possible meanings of the speech segment based on speech recognition algorithms and without using the first public safety impact context information of the second possible meaning.

11. The electronic computing device of claim 1, wherein the plurality of possible meanings of the speech segment includes a third possible meaning that is associated with a third probability that is higher than the second probability associated with the second possible meaning, and wherein the electronic processor is configured to:
determine a first severity level of the first public safety impact context information associated with the second possible meaning;
determine a second severity level of second public safety impact context information associated with the third possible meaning; and
determine that the first severity level is greater than the second severity level;
wherein the electronic processor outputs the second response associated with the second possible meaning without first outputting a third response associated with the third possible meaning in response to determining that the first severity level is greater than the second severity level.

12. The electronic computing device of claim 1, wherein the electronic processor is configured to output, after outputting the second response associated with the second possible meaning, the first response associated with the first possible meaning;
wherein the first response includes at least one of a clarification question associated with the first possible meaning and information associated with the first possible meaning that responds to the audio query.

13. A method of providing a response to an audio query where the response is determined to have a public safety impact, the method comprising:
receiving, via a microphone of an electronic computing device, audio data including a speech segment as a portion of the audio query;
determining, with an electronic processor of the electronic computing device, a plurality of possible meanings of the speech segment, wherein each possible meaning is associated with a probability that the possible meaning is a correct meaning for the speech segment, wherein a first possible meaning of the plurality of possible meanings is associated with a first probability that is higher than a second probability associated with a second possible meaning of the plurality of possible meanings;
determining, with the electronic processor, that the first possible meaning is not associated with public safety impact context information;
determining, with the electronic processor, context information of the second possible meaning, wherein the context information of the second possible meaning includes first public safety impact context information; and
without first outputting a first response to the audio query associated with the first possible meaning, outputting a second response to the audio query associated with the second possible meaning in response to determining that the first possible meaning is not associated with public safety impact context information and that the context information of the second possible meaning includes the first public safety impact context information.

14. The method of claim 13, the method further comprising modifying, with the electronic processor, the second probability associated with the second possible meaning based on the first public safety impact context information.

15. The method of claim 14, wherein modifying the second probability associated with the second possible meaning based on the first public safety impact context information includes increasing the second probability associated with the second possible meaning such that the second probability of the second possible meaning is greater than the first probability of the first possible meaning.

16. The method of claim 13, wherein determining the first public safety impact context information includes retrieving the first public safety impact context information from a local or remote public safety database.

17. The method of claim 13, wherein the second response includes at least one of the group consisting of a clarification question associated with the second possible meaning and information associated with the second possible meaning that responds to the audio query and the method further includes:
- in response to the clarification question being output, receiving, via the microphone, a response to the clarification question indicating that the second possible meaning is the correct meaning; and
- in response to the response to the clarification question indicating that the second possible meaning is the correct meaning, outputting information describing the first public safety impact context information.

18. The method of claim 13, wherein determining the plurality of possible meanings of the speech segment includes determining the plurality of possible meanings of the speech segment based on speech recognition algorithms and without using the first public safety impact context information of the second possible meaning.

19. The method of claim 13, wherein the plurality of possible meanings of the speech segment includes a third possible meaning that is associated with a third probability that is higher than the second probability associated with the second possible meaning, the method further comprising:
- determining a first severity level of the first public safety impact context information associated with the second possible meaning;
- determining a second severity level of second public safety impact context information associated with the third possible meaning;
- determining that the first severity level is greater than the second severity level; and
- outputting, with the electronic processor, the second response associated with the second possible meaning without first outputting the third response associated with the third possible meaning in response to determining that the first severity level is greater than the second severity level.

20. The method of claim 13, the method further comprising:
- outputting, after outputting the second response associated with the second possible meaning, the first response associated with the first possible meaning;
- wherein the first response includes at least one of a clarification question associated with the first possible meaning and information associated with the first possible meaning that responds to the audio query.

* * * * *